(12) United States Patent
Lai et al.

(10) Patent No.: US 10,275,101 B2
(45) Date of Patent: Apr. 30, 2019

(54) INTEGRATED TOUCH CONTROL DISPLAY PANEL AND DISPLAY APPARATUS

(71) Applicants: Xiamen Tianma Micro-Electronics Co., Ltd, Xiamen (CN); Tianma Micro-Electronics Co., Ltd., Shenzhen (CN)

(72) Inventors: Qingjun Lai, Xiamen (CN); Zhaokeng Cao, Xiamen (CN); Poping Shen, Xiamen (CN); Xiufeng Zhou, Xiamen (CN); Yihua Zhu, Xiamen (CN); Zhaodong Zhang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 249 days.

(21) Appl. No.: 15/359,497

(22) Filed: Nov. 22, 2016

(65) Prior Publication Data

US 2017/0075456 A1 Mar. 16, 2017

(30) Foreign Application Priority Data

Jul. 29, 2016 (CN) .......................... 2016 1 0617390

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(58) Field of Classification Search
CPC ......... G06F 2203/04112; G06F 3/0412; G06F 3/044
See application file for complete search history.

(56) References Cited

U.S. PATENT DOCUMENTS

| | | | |
|---|---|---|---|
| 8,279,187 B2 * | 10/2012 | Geaghan | G06F 3/044 178/18.01 |
| 2008/0062148 A1 * | 3/2008 | Hotelling | G02F 1/13338 345/174 |
| 2011/0062146 A1 * | 3/2011 | Kuriki | H05B 3/84 219/553 |

(Continued)

*Primary Examiner* — Viet D Pham
(74) *Attorney, Agent, or Firm* — Kilpatrick Townsend & Stockton, LLP

(57) ABSTRACT

An integrated touch control display panel and a display apparatus are disclosed. The integrated touch control display panel comprises a touch-control-emitting-electrode-array including a plurality of touch control emitting strip electrodes arranged along a first direction; and a touch-control-sensing-electrode-array including a plurality of touch control sensing strip electrodes arranged along a second direction. An orthogonal projection of any touch control sensing strip electrode to the touch-control-emitting-electrode-array at least partially overlaps with any of the touch control emitting strip electrodes; and the touch control sensing strip electrodes are metal mesh electrodes, the metal mesh electrodes comprising a plurality of metal curves. This can reduce the resistance of the touch control sensing strip electrode, such that the integrated touch control display panel and the display apparatus have a more sensitive touch control sensing effect.

21 Claims, 6 Drawing Sheets

(56) References Cited

U.S. PATENT DOCUMENTS

| | | | | |
|---|---|---|---|---|
| 2011/0089160 | A1* | 4/2011 | Kuriki | H05B 3/84 |
| | | | | 219/553 |
| 2012/0187821 | A1* | 7/2012 | Lee | H01L 51/5212 |
| | | | | 313/498 |
| 2012/0194481 | A1* | 8/2012 | Frey | G06F 3/044 |
| | | | | 345/175 |
| 2012/0234663 | A1* | 9/2012 | Hwang | G06F 3/044 |
| | | | | 200/600 |
| 2013/0127772 | A1* | 5/2013 | Guard | G06F 3/044 |
| | | | | 345/174 |
| 2013/0234974 | A1* | 9/2013 | Guard | G06F 3/044 |
| | | | | 345/174 |
| 2013/0299222 | A1* | 11/2013 | Lee | G06F 3/044 |
| | | | | 174/258 |
| 2014/0111709 | A1* | 4/2014 | Kim | G02F 1/13338 |
| | | | | 349/12 |
| 2014/0216783 | A1* | 8/2014 | Trauernicht | G06F 3/044 |
| | | | | 174/126.1 |
| 2014/0216790 | A1* | 8/2014 | Trauernicht | G06F 3/044 |
| | | | | 174/253 |
| 2015/0145824 | A1* | 5/2015 | Park | G06F 3/044 |
| | | | | 345/174 |
| 2015/0293634 | A1* | 10/2015 | Her | G06F 3/044 |
| | | | | 345/174 |
| 2016/0162071 | A1* | 6/2016 | Yeh | G06F 3/044 |
| | | | | 345/174 |

\* cited by examiner

United States Patent US 10,275,101 B2

INTEGRATED TOUCH CONTROL DISPLAY PANEL AND DISPLAY APPARATUS

CROSS-REFERENCES TO RELATED APPLICATIONS

This application claims benefit of the following application: Chinese application No. 201610617390.6, filed on Jul. 29, 2016, which is incorporated herein in its entirety by reference thereto.

TECHNICAL FIELD

The present disclosure generally relates to the technical field of display, and more specifically relates to an integrated touch control display panel and a display apparatus.

BACKGROUND

A touch control display apparatus may detect a coordinate of a finger within a display screen plane of the touch control display apparatus through a touch control electrode, and provides corresponding display based on the coordinate.

Conventionally, a transparent conductive glass is usually employed, e.g., ITO (indium tin oxide), to manufacture the touch control electrode. However, the transparent conductive glass has a larger resistance, causing insufficient sensitivity when detecting a touch control.

In order to solve the problem of relatively large resistance in the case of employing a transparent conductive glass to manufacture the control electrode, there exists a technology which uses a metal mesh electrode as the touch control electrode.

FIG. 1 illustrates a schematic structural diagram of an existing metal mesh electrode. In FIG. 1, the touch control electrode 110 is made of interleaved metal wires. Because the metal wires forming the touch control electrode 110 are zig-zag wires, many sharp pointed angles are present in the touch control electrode 110. The metal wires in a horizontal direction also have a long stretch, causing a larger transverse resistance of the touch control electrode 110.

SUMMARY

It is expected to provide an integrated touch control display panel and a display apparatus.

On the one hand, embodiments of the present disclosure provide an integrated touch control display panel, comprising a touch-control-emitting-electrode-array comprising a plurality of touch control emitting strip electrodes arranged along a first direction; and a touch-control-sensing-electrode-array comprising a plurality of touch control sensing strip electrodes arranged along a second direction; wherein an orthogonal projection of any one of the touch control sensing strip electrodes to the touch-control-emitting-electrode-array overlaps with at least partially any one of the touch control emitting strip electrodes; and the touch control sensing strip electrodes are metal mesh electrodes, the metal mesh electrodes comprising a plurality of metal curves.

On the other hand, embodiments of the present disclosure further provide an integrated touch control display apparatus, comprising the integrated touch control display panel as mentioned above.

According to the solutions of the embodiments in the application, the metal mesh electrodes are used as touch control sensing strip electrodes and the metal wires in the metal mesh electrodes are curved wires, such that the resistance of the touch control sensing strip electrodes are further reduced, and the integrated touch control display panel employing the touch control sensing strip electrodes and the display apparatus present more sensitive touch control sensing effects.

BRIEF DESCRIPTION OF THE DRAWINGS

Through reading the detailed description of the non-limitative embodiments with reference to the accompanying drawings, other features, objectives and advantages of the present disclosure will become more apparent.

DETAILED DESCRIPTION OF EMBODIMENTS

The present disclosure will be further described with reference to the accompanying drawings and embodiments. It may be understood that the preferred embodiments described herein are only for explaining a relevant invention, not for limiting the present invention. Further, it should also be noted that the drawings only illustrate parts related to the invention for the convenience of description.

It should be noted that the embodiments in the present disclosure and the features in the embodiments may be combined mutually in case that no conflicts exist. Hereinafter, the present disclosure will be described in detail with reference to the accompanying drawings in conjunction with the embodiments.

Figure 1:
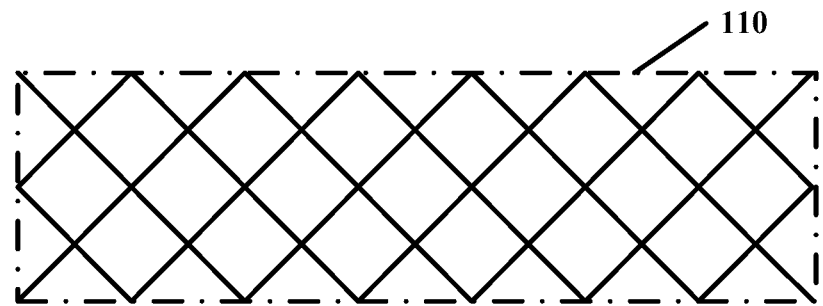
FIG. 1 illustrates a schematic structural diagram of a touch control electrode in the form of a metal mesh in a conventional integrated touch control display panel.
Figure 2:
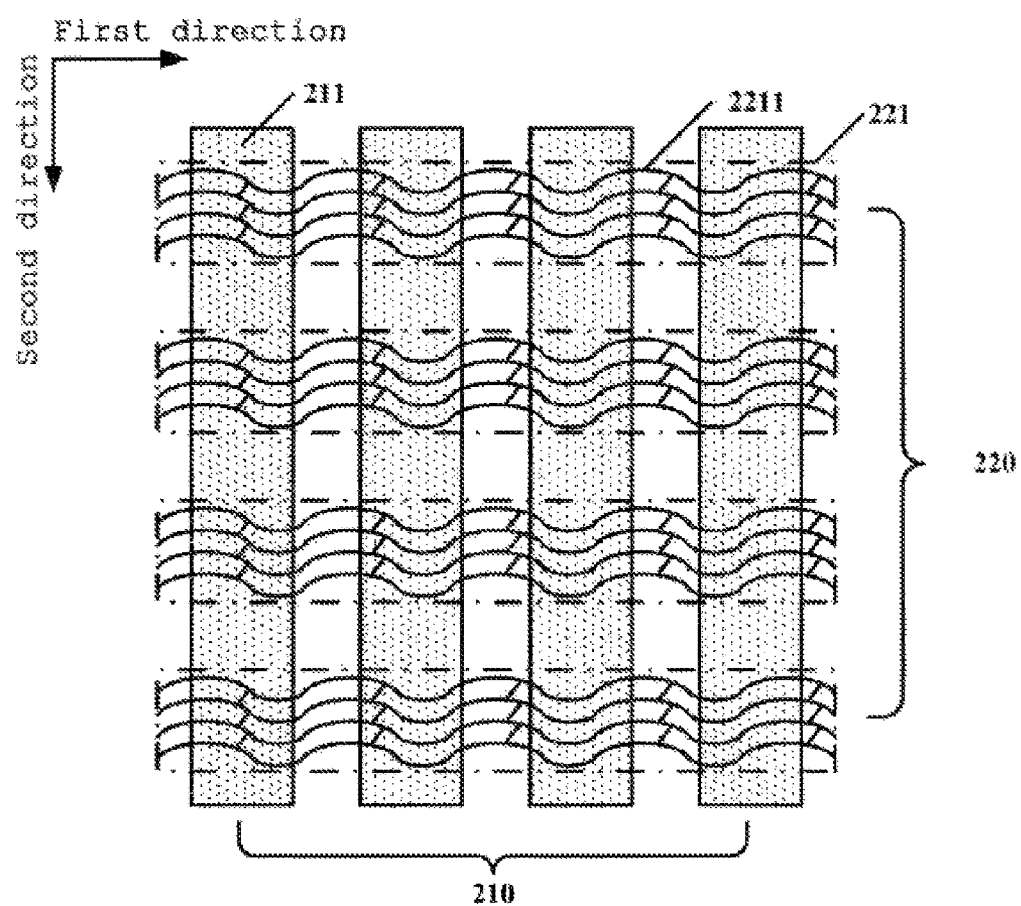
FIG. 2 illustrates a schematic structural diagram of a relative position relationship between a touch-control-emitting-electrode-array and a touch-control-sensing-electrode-array in an integrated touch control display panel of the present disclosure.

FIG. 2 illustrates a schematic structural diagram of a relative position relationship between a touch-control-emitting-electrode-array and a touch-control-sensing-electrode-array in an integrated touch control display panel of the present disclosure.

The integrated touch control display panel of the present disclosure comprises a touch-control-emitting-electrode-array 210 and a touch-control-sensing-electrode-array 220.

The touch-control-emitting-electrode-array 210 comprises a plurality of touch control emitting strip electrodes 211 arranged along a first direction. The touch-control-sensing-electrode-array 220 comprises a plurality of touch control sensing strip electrodes 221 arranged along a second direction. An orthogonal projection of any one of the touch control sensing strip electrodes 221 to the touch-control-emitting-electrode-array 210 overlaps at least partially with any one of the touch control emitting strip electrodes 211. In this way, each touch control emitting electrode 211 may overlap with each touch control sensing strip electrode 221, forming a capacitance at the overlap. When a finger touches the integrated touch control display panel according to this embodiment, the touch position can be correspondingly determined by detecting the position where the capacitance varies.

Moreover, in the integrated touch control display panel of the present disclosure, the touch control sensing strip electrodes 221 are metal mesh electrodes, and each metal mesh electrode comprises a plurality of metal curves 2211.

It uses metal mesh electrodes as the touch control sensing strip electrodes 221, the integrated touch control display panel of the present disclosure has a smaller resistance compared with those touch control sensing strip electrodes manufactured from conductive glass such as ITO in the prior art, and its sensitivity of touch control sensing is thus improved.

Moreover, because the touch control sensing strip electrodes 221 of the present disclosure comprise a plurality of metal curves 2211, which have no sharp corners compared to zig-zag metal lines, the resistance of the touch control sensing strip electrode may be further reduced.

Figure 3:
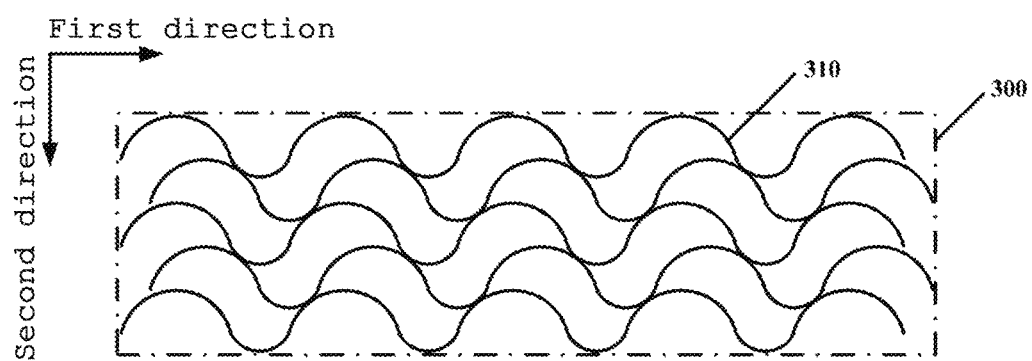
FIG. 3 illustrates a schematic structural diagram of an embodiment of a touch control sensing strip electrode in an integrated touch control display panel of the present disclosure.
Figure 4:
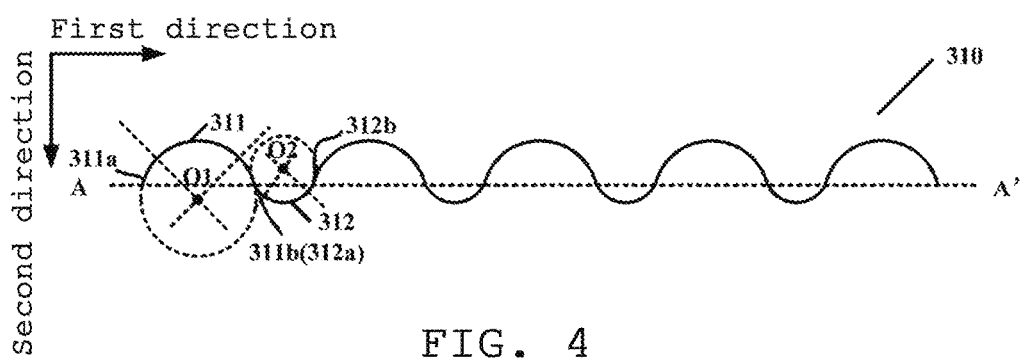
FIG. 4 illustrates a schematic structural diagram of a metal curve in FIG. 3.

FIG. 3 illustrates a schematic structural diagram of an embodiment of a touch control sensing strip electrode in an integrated touch control display panel of the present disclosure, and FIG. 4 is a schematic structural diagram of one of the metal curves in the touch control sensing strip electrode in FIG. 3.

Herein, the touch control sensing strip electrode of this embodiment will be described with reference to FIGS. 3 and 4.

The touch control sensing strip electrode 300 comprises a plurality of metal curves 310.

Each of the metal curves 310 comprises a first metal arc 311 and a second metal arc 312 that are arranged alternatively and in series.

As illustrated in FIG. 3, in the given touch control sensing strip electrode 300, two adjacent metal curves 310 may be electrically connected via a direct contact.

The first metal arcs 311 have a first end 311a and a second end 311b, and the second metal arcs 312 have a third end 312a and a fourth end 312b.

A connecting line between the first end 311a and the second end 311b of the first metal arcs 311 on the given metal curve 310 is parallel to a first direction, and a connecting line between the third end 312a and the fourth end 312b of the second metal arcs 312 on the given metal curve 310 is parallel to the first direction. As illustrated in FIG. 4, the dotted-line AA' is the connecting line that connects the first end 311a and the second end 311b of the first arcs 311 and the line that connects the third end 312a and the fourth end 312b of the second arcs 312 in the metal curve 310. Because the first arcs 311 and the second arcs 312 are arranged alternately and in series, the connecting line between the first end 311a and the second end 311b of the first metal arcs 311 is parallel to the first direction, and the connecting line between the third end 312a and the fourth end 312b of the second metal arcs 312 of the same metal curve 310 is parallel to the first direction, it is apparent that in the same metal curve 310 the connecting line between the first end 311a and the second end 311b of the first metal arcs 311 and the connecting line between the third end 312a and the fourth end 312b of the second metal arcs 312 are located on the same straight line, i.e., line AA' in FIG. 4.

In addition, in the touch control sensing strip electrode of this embodiment, center O1 of the first metal arc 311 and center O2 of the second metal arc 312 on the same given metal curve 310 are disposed at two opposite sides of the metal curve 310.

As illustrated in FIG. 4, the center O1 of the first metal arc 311 is disposed under the first metal curve 310, while the center O2 of the second metal arc 312 is disposed above the first metal curve 310. In this way, the metal curve may transit more smoothly at an intersection between the first metal arc 311 and the second metal arc 312, further avoiding sharp corners from being formed by the metal curves, and thereby further reducing the resistance of the touch control sensing strip electrode 310.

In some embodiments, in the given metal curve, a circle encompassing the first metal arc is tangent to a circle encompassing the second metal arc that is adjacent to the first metal arc. In these optional embodiments, because the first metal arcs and the second metal arcs in the given metal curve are arranged alternatively and in series, a point of tangency between the circle encompassing the first metal arc and the circle encompassing the second metal arc adjacent to the first metal arc is the connection between the adjacent first and second metal arcs.

Figure 5:
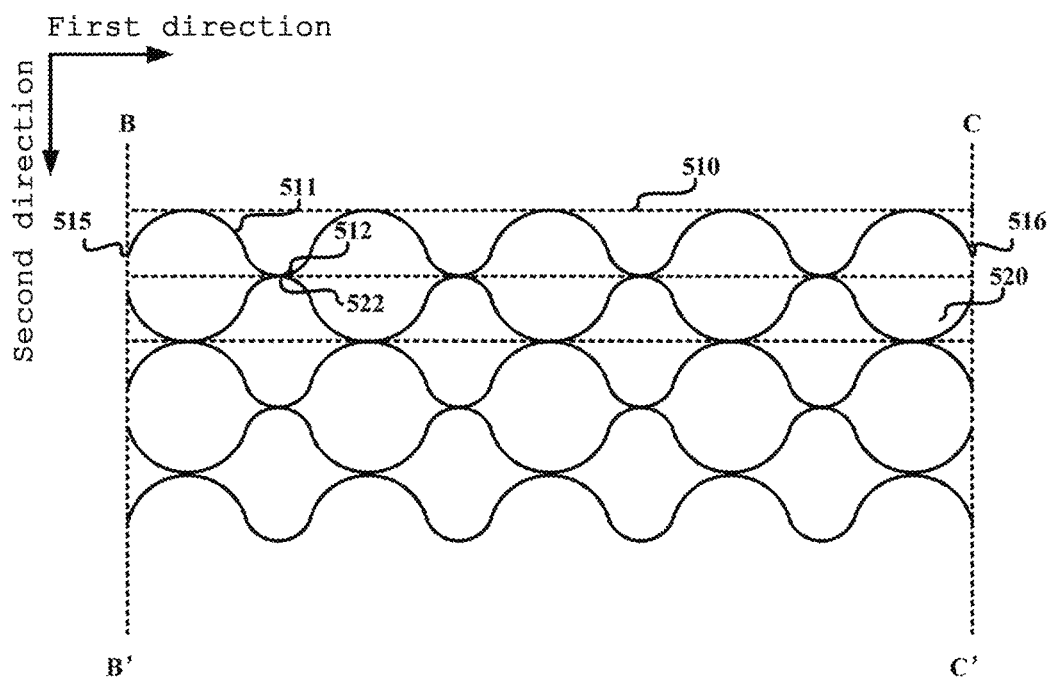
FIG. 5 illustrates a schematic structural diagram of another embodiment of a touch control sensing strip electrode in an integrated touch control display panel of the present disclosure.

FIG. 5 illustrates a schematic structural diagram of another embodiment of a touch control sensing strip electrode in an integrated touch control display panel of the present disclosure.

Similar to the embodiment shown in FIG. 3, the touch control sensing strip electrode of this embodiment is a similar metal mesh electrode, and also comprises a plurality of metal curves 510. Likewise, the metal curves 510 comprise a first metal arc 511 and a second metal arc 512 that are alternately arranged and in series.

Different from the embodiment shown in FIG. 3, in the touch control sensing strip electrode of this embodiment, the metal curves in the given touch control sensing strip electrode have a fifth end 515 and a sixth end 516, a first connecting line BB' sequentially connecting the fifth ends 515 in the given touch control sensing strip electrode is a straight line, and a second connecting line CC' sequentially connecting the sixth ends 516 in the given touch control sensing strip electrode is a straight line. That is, in this embodiment, a starting position and an ending position of the metal curves in the first direction in the given touch control sensing strip electrode are identical.

Here, the fifth end of the metal curves 510 overlaps with the first end of one of the first metal arcs 511 in the metal curves 510. For example, if the fifth end of the metal curve 510 is the most left end of the metal curve, the arc at the most left side of the metal curve 510 is the first metal arc. Similarly, if the fifth end of the metal curve 510 is the most right end of the metal curve, the arc at the most right side of the metal curve 510 is the first metal arc.

Further, in the touch control sensing strip electrodes of this embodiment, the first connecting line BB' and the second connecting line CC' extend along the second direction. In this way, the metal curves 510 in the given touch control sensing strip electrode may have an equal length.

Further, as illustrated in FIG. 5, in this embodiment, any two adjacent metal curves in the given touch control sensing strip electrode are mirror-symmetrical about the first direction.

In the given touch control sensing strip electrode, the first metal arcs of one of any two adjacent metal curves are tangent to the first metal curves of the other one of the two adjacent metal curves. Or, the second metal arcs of one metal curve in any two adjacent metal curves in the given touch control sensing strip electrode are tangent to the second metal arcs of the other metal curve of the two adjacent metal curves.

In other words, in the given touch control sensing strip electrode, any two adjacent metal curves may realize a mutual electrical connection through the tangency of the first metal arcs of the two metal curves, or through the tangency of the second metal arcs of the two metal curves.

For example, in FIG. 5, the two adjacent metal curves 510 and 520 are mirrored-symmetrical, and they are electrically connected through a point of tangency of the second arcs 512, 522 that mutually contact.

Here, it should be noted that the two metal curves 510 adjacent in the second direction shown in FIG. 5 are mirrored-symmetrical, but this is only illustrative and thus not intended to be limiting.

Figure 6:
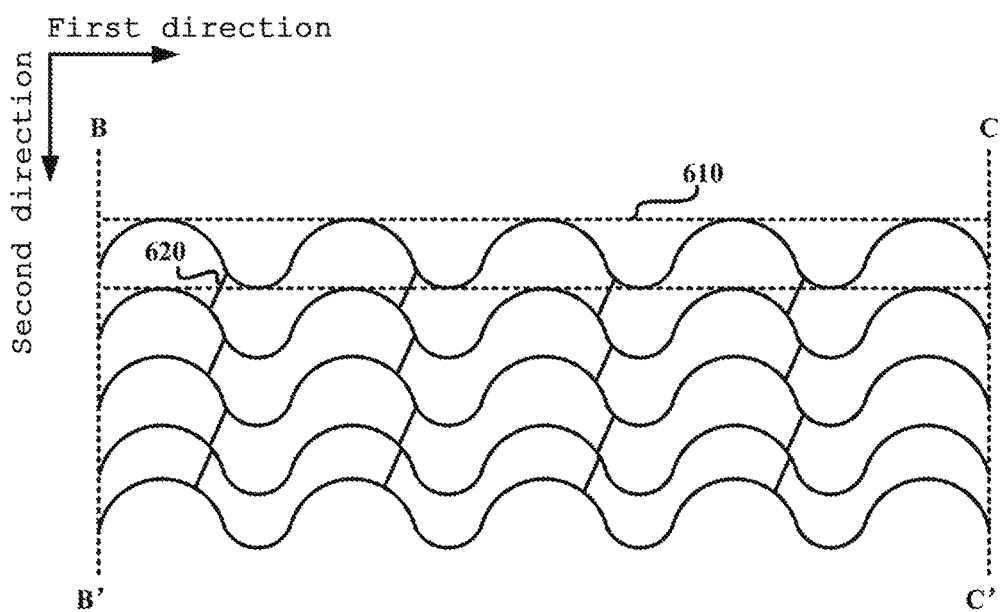
FIG. 6 illustrates a schematic structural diagram of a further embodiment of a touch control sensing strip electrode in an integrated touch control display panel of the present disclosure.

As illustrated in FIG. 6, in a touch control sensing strip electrode of a further embodiment of the present disclosure, a plurality of metal curves 610 adjacent in the second direction may have an identical shape. That is, in the given touch control sensing strip electrode, the metal curves 610 may be formed by translating any one of the metal curves 610 along the second direction. In these optional implementations, two adjacent metal curves 610 may be electrically connected via a plurality of connecting lines 620.

Figure 7:
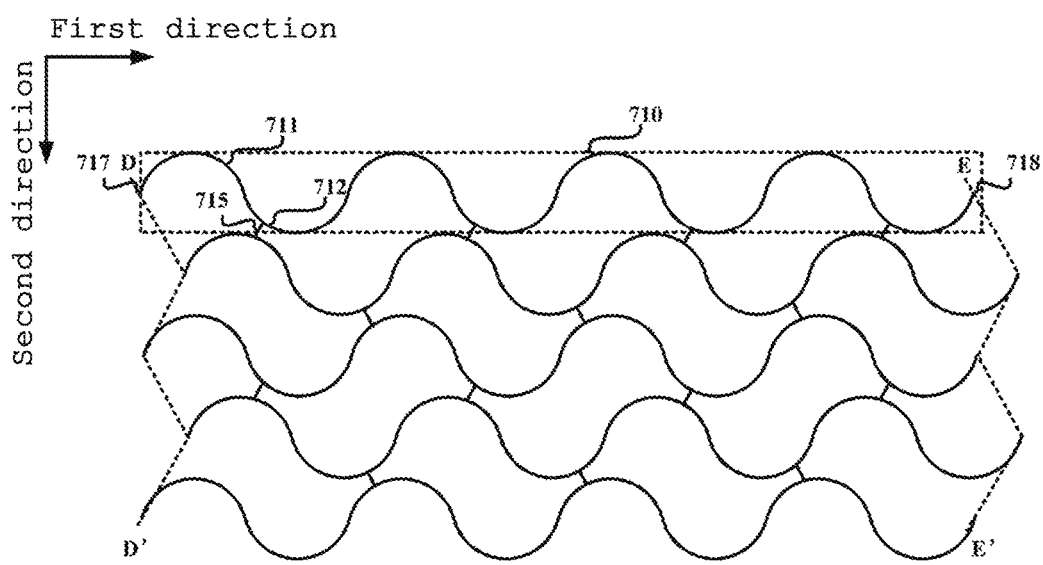
FIG. 7 illustrates a schematic structural diagram of a further embodiment of a touch control sensing strip electrode in an integrated touch control display panel of the present disclosure.

FIG. 7 illustrates a schematic structural diagram of another further embodiment of a touch control sensing strip electrode in an integrated touch control display panel of the present disclosure.

Similar to the embodiment of FIG. 3, the touch control sensing strip electrode of this embodiment is also a metal mesh electrode and comprises a plurality of metal curves 710. The metal curves 710 include a first metal arc 711 and a second metal arc 712 that are arranged alternately and in series.

Different from the embodiment of FIG. 3, in this embodiment, the metal curves 710 in the given touch control sensing strip electrode have a seventh end 717 and an eighth end 718.

A third connecting line DD' sequentially connecting the seventh ends 717 in the given touch control sensing strip electrode is a zig-zag line segment, and a fourth connecting line EE' sequentially connecting the eighth ends 718 in the given touch control sensing strip electrode is a zig-zag line segment.

Further, in this embodiment, the seventh end 717 of the metal curves 710 in the given touch control sensing strip electrode overlaps with the first end of one of the first metal arcs 711 in the metal curves 710 of the touch control sensing strip electrode. For example, if the fifth end of the metal curve 710 is the leftmost end of the metal curve, the arc at the leftmost side of the metal curve 710 is the first metal arc. Similarly, if the fifth end of the metal curve 710 is the rightmost end of the metal curve, the arc at the rightmost side of the metal curve 710 is the first metal arc.

In addition, in the touch control sensing strip electrode of this embodiment, the two adjacent metal curves 710 may be electrically connected via a plurality of fifth connecting lines 715.

In some optional embodiments, the fifth connecting line 715 may be a straight line segment. Or, in some other optional embodiments, the fifth connecting line may be a curve.

When the fifth connecting line is a straight line segment, an included angle α between the fifth connecting line and the first direction may satisfy: $\alpha < 90°$. That is, the fifth connecting line 715 is not vertical to the first direction. In this way, a relatively large included angle may be avoided from being formed between the fifth connecting line 715 and the two metal curves 710 that are electrically connected to the firth connecting line 715, such that the fifth connecting line 715 will not increase the resistance of the entire touch control sensing strip electrode much.

It should be noted that, in the touch control sensing strip electrodes of the embodiments of the present disclosure, there is no limitation to the dimensional relationship between the radii of the first and second metal arcs. That is, the radius r1 of the first metal arc may be equal to, or smaller than, or larger than the radius r2 of the second metal arc.

Moreover, the touch control sensing strip electrodes of the embodiments of the present disclosure may be manufactured by metals having a relatively higher transmission rate, such as nanometer silver wires.

Figure 8:
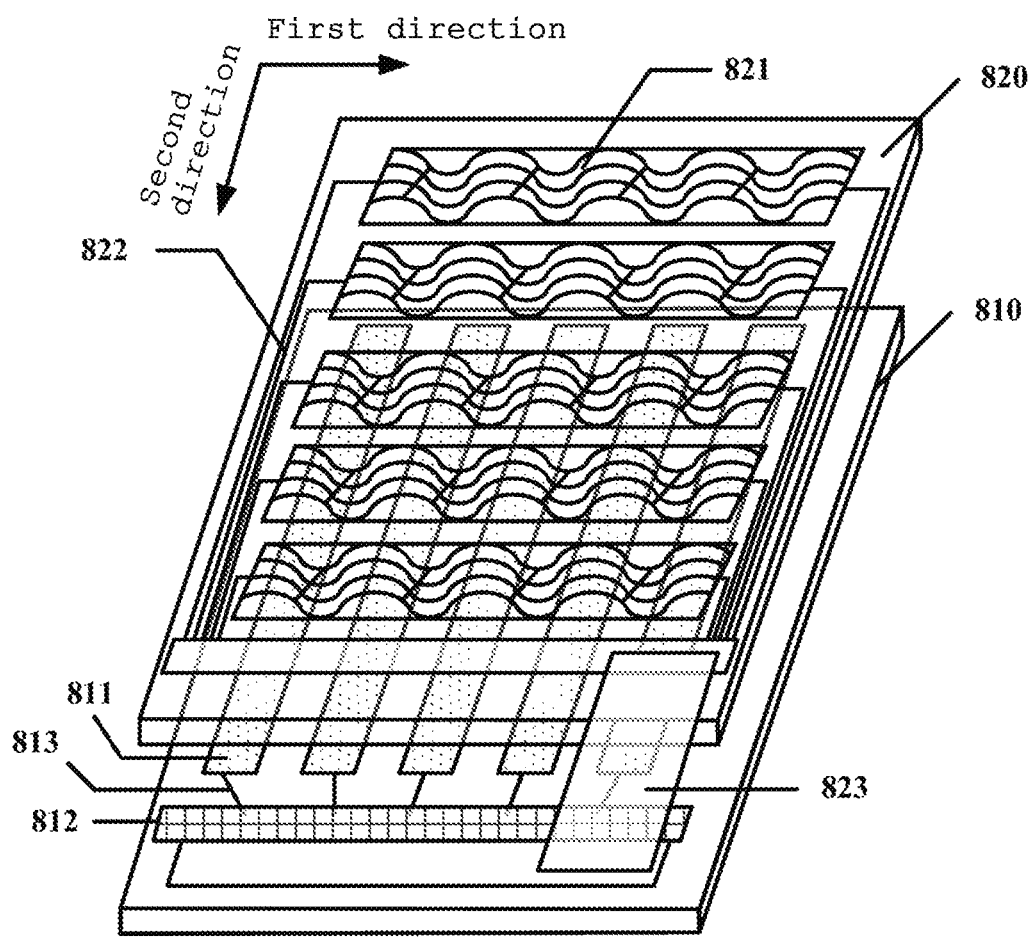
FIG. 8 illustrates a schematic structural diagram of an embodiment of an integrated touch control display panel of the present disclosure.

FIG. 8 illustrates a schematic structural diagram of an embodiment of an integrated touch control display panel of the present disclosure.

In FIG. 8, the integrated touch control display panel comprises an array substrate 810, and a color film substrate 820 disposed opposite to the array substrate.

A touch-control-emitting-electrode-array comprising a plurality of touch control emitting strip electrodes 811 may be provided on the array substrate 810, and the touch-control-sensing-electrode-array comprising a plurality of touch control sensing strip electrodes 821 may be provided on the color film substrate 820.

In some embodiments, the touch-control-sensing-electrode-array may be provided on one side of the color film substrate 820 distal to the array substrate 810. As illustrated in FIG. 8, the touch-control-sensing-electrode-array is provided on the upper surface of the color film substrate 820. The touch-control-emitting-electrode-array may be provided on the array substrate 810 facing the color film substrate 820.

Moreover, in some embodiments, a plurality of scanning lines (not shown in the figure) and data lines (not shown in the figure) are provided on the array substrate 810, the data lines crossing the scanning lines. The crossing scanning lines and the data lines form a pixel array. The scanning lines may extend along the first direction, and the data lines may extend along the second direction. In other words, in these optional implementations, the extending direction of the touch control emitting electrode 811 is identical to the extending direction of the data lines, and the extending direction of the touch control sensing strip electrode 821 is identical to the extending direction of the scanning lines.

The integrated touch control display panel of the present disclosure further comprises an integrated circuit 812, a plurality of touch control scanning signal lines 813, and a plurality of touch control sensing signal lines 822.

First ends of the touch control scanning signal lines 813 are correspondingly connected to the touch control emitting strip electrodes 811, and second ends of the touch control scanning signal lines 813 are connected to the integrated circuit 812. Similarly, first ends of the touch control sensing signal lines 822 are correspondingly connected to the touch control sensing strip electrodes 821, and second ends of the touch control sensing signal lines 822 are connected to the integrated circuit 812. Because the touch control sensing signal lines 822 are provided on the color film substrate 820, while the integrated circuit 812 is provided on the array substrate 810, a conductive path may be formed, for example, through an FPC (flexible circuit board) 823 that is connected between the touch control sensing signal lines 822 and the integrated circuit 812, so as to implement an electrical connection between the touch control sensing signal lines 822 and the integrated circuit 812.

The integrated circuit 812 may provide touch control scanning signals to the touch control emitting strip electrodes 811 and receive touch control sensing signals from the touch control sensing strip electrodes 821 during a touch control period. For example, during the touch control period, the integrated circuit sequentially provides touch control scanning signals to the touch control emitting strip electrodes 811, and meanwhile receives all touch control sensing signals from the touch control sensing strip electrodes 821. A touch control position may be determined based on different touch control sensing signals transmitted by the touch control sensing strip electrodes 821 to the integrated circuit 812.

In some optional embodiments, in the integrated touch control display panel of the present disclosure, the touch control sensing signal lines 822 and the touch control sensing strip electrodes 821 may be provided on the same conductive layer. Or, in some other optional embodiments, the touch control sensing signal lines and the touch control sensing strip electrodes may be provided on different conductive layers. In this case, the touch control sensing signal lines may achieve an electrical connection with the touch control sensing strip electrodes by a direct contact, or via through-holes formed on an insulation layer between a conductive layer on which the touch control sensing lines are located and a conductive layer on which the touch control sensing strip electrodes are located.

In some other optional embodiments, in the integrated touch control display panel of the present disclosure, the touch control emitting strip electrodes 811 may be multiplexed as common electrodes during a display period. In these optional embodiments, the integrated circuit 812 may be further configured to provide a common voltage signal to the touch control emitting strip electrodes 811 during the display period, such that liquid crystal molecules in a liquid crystal layer (not shown) formed between the array substrate 810 and the color film substrate 820 may be deflected under an action of an electrical field formed by the common electrode and the pixel electrodes, thereby realizing display of predetermined pictures.

Figure 9:
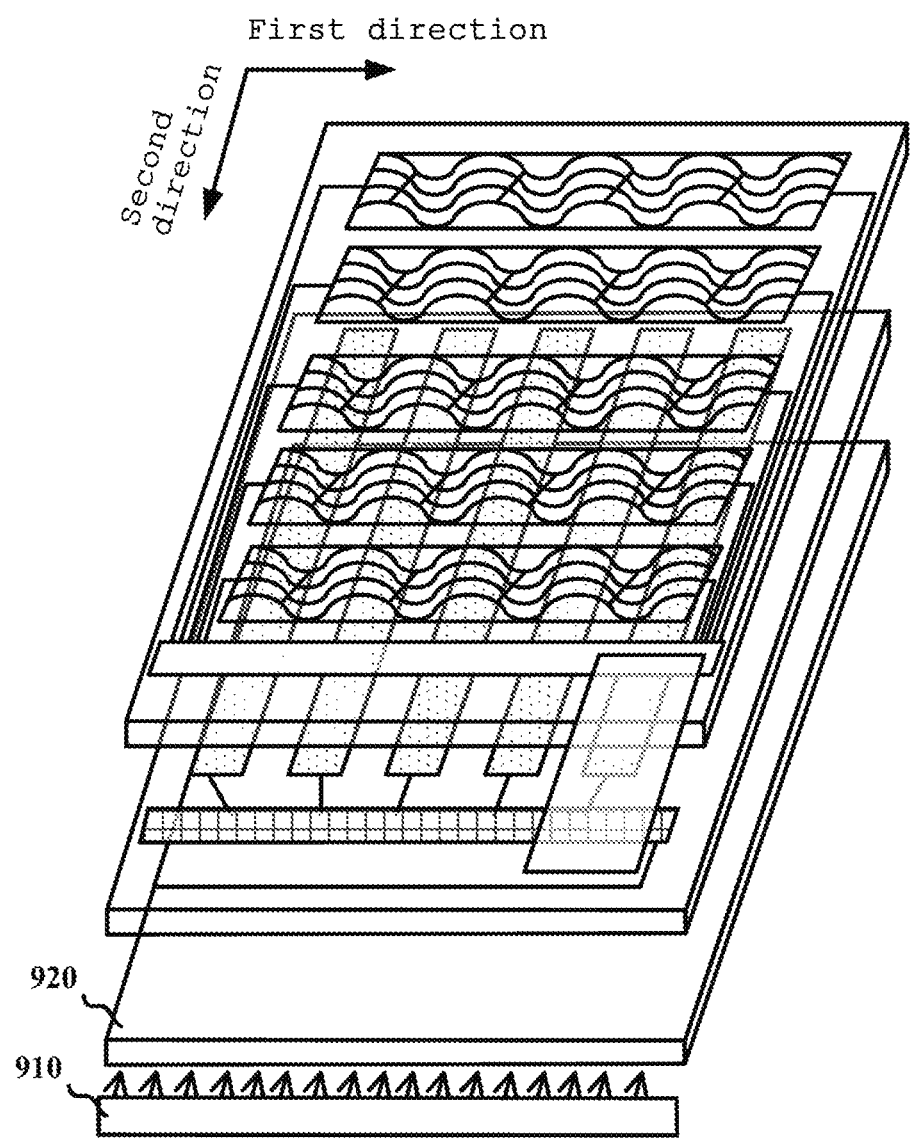
FIG. 9 illustrates a schematic structural diagram of an embodiment of an integrated touch control display apparatus of the present disclosure.

As illustrated in FIG. 9, the present disclosure also discloses an integrated touch control display apparatus that may comprise an integrated touch control display panel as mentioned above. Those skilled in the art should understand that except the integrated touch control display panel as mentioned above, the integrated touch control display apparatus may also comprise some other known structures such as a backlight unit. The backlight unit may comprise a light source 910 and a light guide plate 920. For example, the light source 910 may be provided on one side of the light guide plate 920. The light guide plate 920 receives lights from the light source 910 and emits the lights to the display panel. In order not to confuse the focus of the present disclosure, these known structures will not be further described.

Those skilled in the art should understand that the invention scope of the present disclosure is not limited to a technical solution formed by a specific combination of the technical features as described above, and meanwhile it should cover other technical solutions obtained by any combination of the above technical features or their equivalents without departing from the ideas of the invention. For example, technical solutions obtained by mutual substitutions of the above features and technical features with similar functions disclosed in the present disclosure (but not limited thereto) should be covered by the invention.

The invention claimed is:

1. An integrated touch control display panel, wherein it comprises:
   - a touch-control-emitting-electrode-array including a plurality of touch control emitting strip electrodes arranged along a first direction; and
   - a touch-control-sensing-electrode-array including a plurality of touch control sensing strip electrodes arranged along a second direction; wherein
   - an orthogonal projection of any one of the touch control sensing strip electrodes to the touch-control-emitting-electrode-array overlaps at least partially with any one of the touch control emitting strip electrodes;
   - the touch control sensing strip electrodes are metal mesh electrodes, the metal mesh electrodes comprising a plurality of metal curves;
   - the metal curves comprise first metal arcs and second metal arcs arranged alternately and in series;
   - the first metal arcs have a first end and a second end; the second metal arcs have a third end and a fourth end;
   - lines connecting first ends and second ends of the respective first metal arcs on a given metal curve is parallel to the first direction, and lines connecting third ends and fourth ends of the respective second metal arcs on the given metal curve is parallel to the first direction;
   - a center of the first metal arc and a center of the second metal arc on the given metal curve are disposed on two opposite sides of the metal curve;
   - the metal curves in a given touch control sensing strip electrode have a fifth end and a sixth end;
   - a first connecting line connecting the respective fifth ends in the given touch control sensing strip electrode is a straight line segment and a second connecting line connecting the respective sixth ends in the given touch control sensing strip electrode is a straight line segment; and
   - two adjacent metal curves in the given touch control sensing strip electrode are mirrored symmetrical about the first direction.

2. The integrated touch control display panel according to claim 1, wherein:
   - a circle encompassing the first metal arc is tangent to a circle encompassing the second metal arc adjacent to the first metal arc in the given metal curve.

3. The integrated touch control display panel according to claim 1, wherein:
   - the fifth ends of the respective metal curves in the given touch control sensing strip electrode overlap with the first ends of the respective first metal arcs in the respective metal curves of the touch control sensing strip electrode.

4. The integrated touch control display panel according to claim 3, wherein:

the first connecting line and the second connecting line extend along the second direction.

5. The integrated touch control display panel according to claim 3, wherein the respective touch control sensing strip electrodes further comprise a plurality of fifth connecting lines; and the fifth connecting line is a straight line segment for connecting any two adjacent metal curves in the given touch control sensing strip electrode.

6. The integrated touch control display panel according to claim 5, wherein an included angle α between the connecting line and the first direction satisfies:
α<90°.

7. The integrated touch control display panel according to claim 1, wherein:

the first metal arcs of one metal curve of the two adjacent metal curves in the given touch control sensing strip electrode are tangent to the first metal arcs of the other metal curve of the two adjacent metal curves; or the second metal arcs of one metal curve of the two adjacent metal curves in the given touch control sensing strip electrode are tangent to the second metal arcs of the other metal curve of the two adjacent metal curves.

8. The integrated touch control display panel according to claim 1, wherein the integrated touch control display panel further comprises a plurality of touch control sensing signal lines;

first ends of the respective touch control sensing signal lines are correspondingly connected to the touch control sensing strip electrodes.

9. The integrated touch control display panel according to claim 8, wherein:

the touch control sensing signal lines and the touch control sensing strip electrodes are disposed in a single electrically conductive layer.

10. The integrated touch control display panel according to claim 8, comprising:

an array substrate, the touch-control-emitting-electrode-array provided on the array substrate; and a color film substrate provided opposite to the array substrate, the touch-control-sensing-electrode-array provided on the color film substrate;

wherein the touch-control-sensing-electrode-array is provided on a side of the color film substrate distal to the array substrate; and the touch-control-emitting-electrode-array is provided on the array substrate facing the color film substrate.

11. The integrated touch control display panel according to claim 10, wherein:

the array substrate is further formed with a plurality of scanning lines, and data lines crossing the scanning lines;

the scanning lines extend along the first direction, and the data lines extend along the second direction.

12. The integrated touch control display panel according to claim 10, further comprising an integrated circuit and a plurality of touch control scanning signal lines;

first ends of the touch control scanning signal lines correspondingly connected to the touch control emitting strip electrodes, and second ends of the touch control scanning signal lines correspondingly connected to the integrated circuit;

second ends of the touch control sensing signal lines correspondingly connected to the integrated circuit; and the integrated circuit providing a touch control scanning signal to the touch control emitting strip electrodes and receiving touch control sensing signals from the touch control sensing strip electrodes during a touch control period;

wherein the touch control emitting strip electrodes may be multiplexed as common electrodes during a display period; and the integrated circuit is configured to provide a common voltage signal to the touch control emitting strip electrodes during the display period.

13. An integrated touch control display panel according to claim 3, comprising:

a touch-control-emitting-electrode-array including a plurality of touch control emitting strip electrodes arranged along a first direction; and a touch-control-sensing-electrode-array including a plurality of touch control sensing strip electrodes arranged along a second direction; wherein an orthogonal projection of any one of the touch control sensing strip electrodes to the touch-control-emitting-electrode-array overlaps at least partially with any one of the touch control emitting strip electrodes; and the touch control sensing strip electrodes are metal mesh electrodes, the metal mesh electrodes comprising a plurality of metal curves; wherein the metal curves comprise first metal arcs and second metal arcs arranged alternately and in series;

the first metal arcs have a first end and a second end; the second metal arcs have a third end and a fourth end;

lines connecting first ends and second ends of the respective first metal arcs on a given metal curve is parallel to the first direction, and lines connecting third ends and fourth ends of the respective second metal arcs on the given metal curve is parallel to the first direction; and a center of the first metal arc and a center of the second metal arc on the given metal curve are disposed on two opposite sides of the metal curve; wherein the respective metal curves in the given touch control sensing strip electrode have a seventh end and an eighth end;

a third connecting line sequentially connecting the respective seventh ends in the given touch control sensing strip electrode is a zig-zag line segment, and a fourth connecting line sequentially connecting the respective eighth ends in the given touch control sensing strip electrode is a zig-zag line segment; and the seventh ends of the respective metal curves in the given touch control sensing strip electrode overlap with first ends of the first metal arcs in the metal curves of the touch control sensing strip electrode;

wherein the respective touch control sensing strip electrodes further comprise a plurality of fifth connecting lines; and the fifth connecting line is a straight line segment for connecting any two adjacent metal curves in the given touch control sensing strip electrode.

14. The integrated touch control display panel according to claim 13, wherein an included angle α between the connecting line and the first direction satisfies:
α<90°.

15. The integrated touch control display panel according to claim 13, wherein the integrated touch control display panel further comprises a plurality of touch control sensing signal lines;

first ends of the respective touch control sensing signal lines are correspondingly connected to the touch control sensing strip electrodes.

16. The integrated touch control display panel according to claim 15, wherein:
the touch control sensing signal lines and the touch control sensing strip electrodes are disposed in a single electrically conductive layer.

17. The integrated touch control display panel according to claim 15, comprising:
an array substrate, the touch-control-emitting-electrode-array provided on the array substrate; and
a color film substrate provided opposite to the array substrate, the touch-control-sensing-electrode-array provided on the color film substrate;
wherein the touch-control-sensing-electrode-array is provided on a side of the color film substrate distal to the array substrate; and
the touch-control-emitting-electrode-array is provided on the array substrate facing the color film substrate.

18. The integrated touch control display panel according to claim 17, wherein:
the array substrate is further formed with a plurality of scanning lines, and data lines crossing the scanning lines;
the scanning lines extend along the first direction, and the data lines extend along the second direction.

19. The integrated touch control display panel according to claim 17, further comprising an integrated circuit and a plurality of touch control scanning signal lines;
first ends of the touch control scanning signal lines correspondingly connected to the touch control emitting strip electrodes, and second ends of the touch control scanning signal lines correspondingly connected to the integrated circuit;
second ends of the touch control sensing signal lines correspondingly connected to the integrated circuit;
the integrated circuit providing a touch control scanning signal to the touch control emitting strip electrodes and receiving touch control sensing signals from the touch control sensing strip electrodes during a touch control period;
the touch control emitting strip electrodes may be multiplexed as common electrodes during a display period; and
the integrated circuit is configured to provide a common voltage signal to the touch control emitting strip electrodes during the display period.

20. The integrated touch control display panel according to claim 13, wherein a circle encompassing the first metal arc is tangent to a circle encompassing the second metal arc adjacent to the first metal arc in the given metal curve.

21. An integrated touch control display, comprising an integrated touch control display panel, wherein the integrated touch control display panel comprises:
a touch-control-emitting-electrode-array including a plurality of touch control emitting strip electrodes arranged along a first direction; and
a touch-control-sensing-electrode-array including a plurality of touch control sensing strip electrodes arranged along a second direction;
an orthogonal projection of any one of the touch control sensing strip electrodes to the touch-control-emitting-electrode-array overlaps at least partially with any one of the touch control emitting strip electrodes; and
the touch control sensing strip electrodes are metal mesh electrodes, the metal mesh electrodes comprising a plurality of metal curves;
wherein the metal curves comprise first metal arcs and second metal arcs arranged alternately and in series;
the first metal arcs have a first end and a second end; the second metal arcs have a third end and a fourth end;
lines connecting first ends and second ends of the respective first metal arcs on a given metal curve is parallel to the first direction, and lines connecting third ends and fourth ends of the respective second metal arcs on the given metal curve is parallel to the first direction; and
a center of the first metal arc and a center of the second metal arc on the given metal curve are disposed on two opposite sides of the metal curve; wherein
the respective metal curves in the given touch control sensing strip electrode have a seventh end and an eighth end;
a third connecting line sequentially connecting the respective seventh ends in the given touch control sensing strip electrode is a zig-zag line segment, and a fourth connecting line sequentially connecting the respective eighth ends in the given touch control sensing strip electrode is a zig-zag line segment; and
the seventh ends of the respective metal curves in the given touch control sensing strip electrode overlap with first ends of the first metal arcs in the metal curves of the touch control sensing strip electrode;
wherein the respective touch control sensing strip electrodes further comprise a plurality of fifth connecting lines; and
the fifth connecting line is a straight line segment for connecting any two adjacent metal curves in the given touch control sensing strip electrode.

* * * * *